United States Patent
Kagami

(10) Patent No.: US 11,838,696 B2
(45) Date of Patent: Dec. 5, 2023

(54) PROJECTION SYSTEM, PROJECTION SYSTEM CONTROL DEVICE, PROJECTION METHOD, AND PROGRAM

(71) Applicant: TOHOKU UNIVERSITY, Miyagi (JP)

(72) Inventor: Shingo Kagami, Miyagi (JP)

(73) Assignee: TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 17/587,292

(22) PCT Filed: Aug. 28, 2020

(86) PCT No.: PCT/JP2020/032650
§ 371 (c)(1),
(2) Date: Feb. 28, 2022

(87) PCT Pub. No.: WO2021/039977
PCT Pub. Date: Mar. 4, 2021

(65) Prior Publication Data
US 2022/0201263 A1 Jun. 23, 2022

(30) Foreign Application Priority Data
Aug. 29, 2019 (JP) .................. 2019-156876

(51) Int. Cl.
*H04N 9/31* (2006.01)
(52) U.S. Cl.
CPC ......... *H04N 9/3185* (2013.01); *H04N 9/3194* (2013.01)
(58) Field of Classification Search
CPC .......... G01R 33/56; G06T 5/00; G06T 5/001; G06T 5/006; G06T 2207/20172;
(Continued)

(56) References Cited

U.S. PATENT DOCUMENTS

| 2008/0062164 A1 | 3/2008 | Bassi et al. |
| 2009/0310035 A1* | 12/2009 | Jung ............... H04N 9/3185 |
| | | 348/744 |

(Continued)

FOREIGN PATENT DOCUMENTS

| JP | 2008113416 A | 5/2008 |
| JP | 2017215374 A | 7/2017 |

(Continued)

OTHER PUBLICATIONS

Audet et al., "Augmenting moving planar surfaces robustly with video projection and direct image alignment," Springer-Verlag London Limiteed 2012, Apr. 11, 2012, 12 pages.

(Continued)

*Primary Examiner* — John W Miller
*Assistant Examiner* — Humam M Satti
(74) *Attorney, Agent, or Firm* — Lee & Hayes, P.C.

(57) ABSTRACT

A projection system includes a projector that projects a content image and a pattern image, a camera that photographs a projection surface when the pattern image is projected, a camera deformation value calculation unit that calculates a texture deformation value indicating a change in position, orientation, or shape of the projection surface on the basis of a photographing result, a projector deformation value acquisition unit that acquires a projector deformation value for converting the content image on the basis of the pattern image captured in the photographing result and the texture deformation value, and a transmission image acquisition unit that executes processing of deforming the content image on the basis of the projector deformation value and processing of deforming the pattern image on the basis of the (Continued)

projector deformation value, and the pattern image satisfies a condition that a plurality of types of solid color regions having different brightness values are included.

11 Claims, 11 Drawing Sheets

(58) Field of Classification Search
CPC ......... G06T 3/005; G06T 3/00; G06T 3/0093; H04N 9/3185; H04N 9/3194; H04N 5/2628; G03B 21/56; G03B 2205/0007; G02B 30/56
See application file for complete search history.

(56) References Cited

U.S. PATENT DOCUMENTS

| | | | |
|---|---|---|---|
| 2010/0201894 A1 | 8/2010 | Nakayama et al. | |
| 2015/0208019 A1* | 7/2015 | Stewart | H04N 5/7416 348/745 |
| 2016/0142691 A1* | 5/2016 | Kobiki | H04N 9/3194 348/746 |
| 2017/0347076 A1 | 11/2017 | Fuchikami et al. | |
| 2018/0101962 A1 | 4/2018 | Takizawa et al. | |
| 2018/0188020 A1 | 7/2018 | Fuchikami | |

FOREIGN PATENT DOCUMENTS

| | | |
|---|---|---|
| WO | WO2009142015 A1 | 11/2009 |
| WO | WO2017002293 A1 | 1/2017 |

OTHER PUBLICATIONS

PCT International Search Report for Application No. PCT/JP2020/032650, dated Nov. 17, 2020, 4 pages.
Kagami et al., "Sticky Projection Mapping: 450-fps Tracking Projection onto a Moving Planar Surface," Graduate School of Information Sciences, Tohoku University, Japan, Nov. 2-6, 2015, 3 pages.
Raskar et al., "The Office of the Future: A Unified Approach to Image-Based Modeling and Spatially Immersive Displays," Universy of North Carolina at Chapel Hill and the NSF Science and Technology Center for Computer Graphics and Scient ific Visualization, SIGGRAPH 98, Orlando, Florida, Jul. 19-24, 1998, 10 pages.
The European Office Action dated Jul. 27, 2023 for EP Patent Application 20856478.1 a foreign counterpart to U.S. Appl. No. 17/587,292 13 pages.

* cited by examiner

FIG. 3

| PHOTOGRAPHING TIMING | TEXTURE DEFORMATION VALUE | PATTERN DEFORMATION VALUE | CAMERA DEFORMATION VALUE | |
|---|---|---|---|---|
| T1 | Vc1 | Vp1 | Vt1 | |
| T2 | Vc2 | Vp2 | Vt2 | ---D101 |
| T3 | Vc3 | Vp3 | Vt3 | |
| ... | ... | ... | ... | |

PROJECTION SYSTEM, PROJECTION SYSTEM CONTROL DEVICE, PROJECTION METHOD, AND PROGRAM

This Application is a national stage application of an international patent application PCT/JP2020/032650 filed on Aug. 28, 2020 which claims priority to Japanese Patent Application No. 2019-156876 filed on Aug. 29, 2019, both of which is incorporated herein by reference.

TECHNICAL FIELD

The present invention relates to a projection system, a projection system control device, a projection method, and a program.

BACKGROUND ART

In the related art, in a projection mapping technology for making an image follow a moving projection surface, a projection surface in a state on which an image has been projected is photographed by a camera, and the image (projected content) is made to follow the motion of the projection surface on the basis of the photographing results. In such a projection mapping technology, there is a problem that alignment of a projector or a camera or markings on the projection surface is required in advance and it is difficult for the user to use the technology. Therefore, for example, a method of following a camera image obtained when projected content is superimposed on a texture on a projection surface while simulating the camera image has been proposed (Non-Patent Document 1). In the case of this method, when a texture on the projection surface and the projected content on the projection surface can be tracked using the camera image, prior alignment, marking, or the like is not required. However, in such a method, the amount of calculation is large and it is difficult to make a content image follow a movement of the projection surface. In addition, for example, a method of limiting the projection surface to a solid color surface and limiting a shape of the projection surface to a known surface (Non-Patent Document 2) to make the projected content follow without simulation has been proposed. However, there is a problem that the texture on the projection surface cannot be used as a tracking indicator.

The two proposed methods also have a problem that the content image must have a characteristic of allowing a motion of the content image to be tracked by a camera. Therefore, it has been proposed that, when the projection surface is not solid color, a pattern image difficult for humans to perceive is hidden in a projected image, and a motion of the content image is tracked by the pattern image. However, this method requires a camera to photograph a plurality of consecutive images (Patent Document 1 and Non-Patent Document 3). Therefore, there is a problem that a capability of following a movement of the projection surface is limited depending on a shutter speed of the camera, and when the movement of the projection surface is fast, a correct operation is not performed. Thus, when the projection surface is not solid color, position deviation on the projection surface of the plurality of images that are sequentially projected onto the projection surface may become large.

CITATION LIST

Patent Literature

[Patent Document 1] International Publication No. 2017/002293

Non-Patent Literature

[Non-Patent Document 1] S. Audet, M. Okutomi, M. Tanaka, "Augmenting moving planar surfaces robustly with video projection and direct image alignment", Virtual Reality, vol. 17, 2013.

[Non-Patent Document 2] S. Kagami and K. Hashimoto, "Sticky projection mapping: 450-fps tracking projection onto a moving planar surface", Proc. SIGGRAPH Asia 2015 Emerging Technologies, 2015.

[Non-Patent Document 3] Ramesh Raskar, Greg Welch, Matt Cutts, Adam Lake, Lev Stesin, and Henry Fuchs "The Office of the Future: A Unified Approach to Image-Based Modeling and Spatially Immersive Displays", Computer Graphics Proceedings, Annual Conference Series, 1998.

SUMMARY OF INVENTION

Technical Problem

An object of the present invention is to provide a technology for curbing position deviation on a projection surface of a plurality of images that are sequentially projected on the moving projection surface in a technology for moving an image projected onto the projection surface according to a movement of the projection surface in view of the above circumstances.

Solution to Problem

One aspect of the present invention is a projection system including: a projector configured to project a content image and a pattern image satisfying a predetermined condition onto a projection surface having a front surface, the front surface not being solid color; a camera configured to photograph the projection surface at a photographing timing, the photographing timing being a timing at which the pattern image is projected; a camera deformation value calculation unit configured to calculate a texture deformation value indicating a change in position, orientation, or shape of the projection surface on the basis of a camera image, the camera image being a photographing result of the camera; a projector deformation value acquisition unit configured to acquire a projector deformation value of image deformation for converting an image projected by the projector into an image according to a state of the projection surface on the basis of the pattern image captured in the camera image and the texture deformation value; and a transmission image acquisition unit configured to execute processing of performing image deformation on the content image on the basis of the projector deformation value and processing of performing image deformation on the pattern image on the basis of the projector deformation value, wherein the predetermined condition includes a condition that a plurality of types of solid color regions having different brightness values are included.

One aspect of the present invention is a projection system control device including: a projector configured to project a content image and a pattern image satisfying a predetermined condition onto a projection surface having a front surface, the front surface being not a solid color; a camera configured to photograph the projection surface at a photographing timing, the photographing timing being a timing at which the pattern image is projected; a camera deformation value calculation unit configured to calculate a texture deformation value indicating a change in position, orientation, or shape of the projection surface on the basis of a camera image, the camera image being a photographing result of the camera; a projector deformation value acquisition unit configured to acquire a projector deformation value of image deformation for converting an image projected by the projector into an image according to a state of the projection surface on the basis of the pattern image captured in the camera image and the texture deformation value; and a transmission image acquisition unit configured to execute processing of performing image deformation on the content image on the basis of the projector deformation value and processing of performing image deformation on the pattern image on the basis of the projector deformation value, wherein the predetermined condition includes a condition that a plurality of types of solid color regions having different brightness values are included, and the area of at least one of the plurality of types of solid color regions is larger than a predetermined area.

One aspect of the present invention is a projection method including: a projection step of projecting a content image and a pattern image satisfying a predetermined condition onto a projection surface having a front surface, the front surface being not a solid color; a photographing step of photographing the projection surface at a photographing timing, the photographing timing being a timing at which the pattern image is projected; a camera deformation value calculation step of calculating a texture deformation value indicating a change in position, orientation, or shape of the projection surface on the basis of a camera image, the camera image being a photographing result of a photographing system; a projector deformation value acquisition step of acquiring a projector deformation value of image deformation for converting an image projected in the projection step into an image according to a state of the projection surface on the basis of the pattern image captured in the camera image and the texture deformation value; and a transmission image acquisition step of executing processing of performing image deformation on the content image on the basis of the projector deformation value and processing of performing image deformation on the pattern image on the basis of the projector deformation value, wherein the predetermined condition includes a condition that a plurality of types of solid color regions having different brightness values are included.

One aspect of the present invention is a program for causing a computer to function as the projection system.

One aspect of the present invention is a program for causing a computer to function as the projection system control device.

Advantageous Effects of Invention

According to the present invention, it is possible to provide a technology for curbing position deviation on a projection surface of a plurality of images that are sequentially projected on the moving projection surface in a technology for moving an image projected onto the projection surface according to a movement of the projection surface.

BRIEF DESCRIPTION OF DRAWINGS

FIG. 3 is a schematic diagram illustrating an example of information indicating a history of deformation values in the first embodiment.

DESCRIPTION OF EMBODIMENTS

First Embodiment

Figure 1:
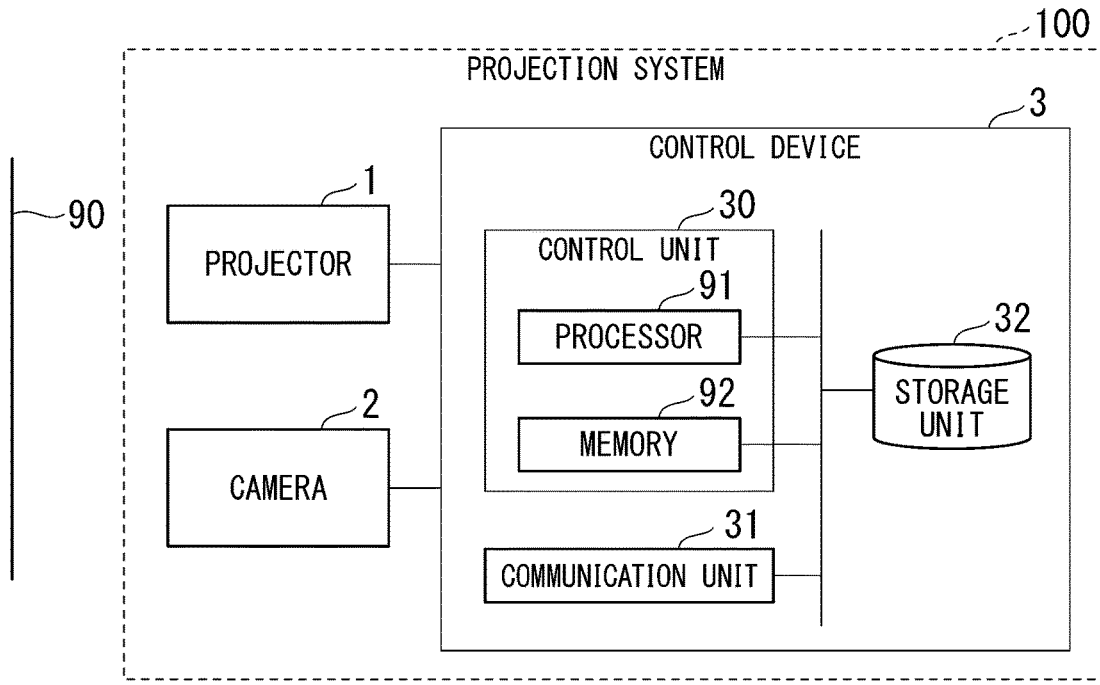
FIG. 1 is a diagram illustrating an example of a system configuration of a projection system 100 of a first embodiment.

FIG. 1 is a diagram illustrating an example of a system configuration of a projection system 100 of a first embodiment. The projection system 100 projects a plurality of still images at a predetermined frame rate onto a projection surface 90 that can be moved, rotated, or deformed while switching between the still images. The frame rate is the number of still images projected onto the projection surface 90 in a unit time. The frame rate is, for example, 2400 fps (frame per second). The projection system 100 projects at least two types of still images onto the projection surface 90.

One of the still images is a content image and the other is a pattern image. A front surface of the projection surface 90 is not solid color. Hereinafter, a pattern of the front surface of the projection surface 90 is referred to as an object texture.

The pattern image is an image projected onto the projection surface 90 for correction of the content image according to a change in position, orientation, or shape (hereinafter referred to as a "three-dimensional state") of the projection surface 90. Specifically, the pattern image is an image satisfying the following first pattern image conditions. The first pattern image conditions include a condition that a plurality of types of solid color regions having different brightness values are included, and an area of at least one of the plurality of types of solid color regions is larger than a predetermined area. The predetermined area is, for example, an area determined in advance according to a rate of change in position, orientation, or shape of the projection surface 90 and an object texture. The predetermined area may be, for example, the area of a surface that satisfies a first back projection condition. The first back projection condition is a condition that a shape is a rectangle in which a product of a back projection vector and a frame time is equal to a length of a diagonal line thereof. The back projection vector is a vector obtained by back-projecting a motion vector of the projection surface 90 onto the pattern image. Further, the predetermined area may be, for example, an area of a surface that satisfies a second back projection condition. The second back projection condition is a condition that an area is equal to a square of the product of the back projection vector and the frame time. The predetermined area may be, for example, an area of a surface that satisfies a third back projection condition when at least one of the solid color regions has a shape which is longer in one direction. The third back projection condition is a condition that an area is substantially 0. The predetermined area may be, for example, an area of a surface that satisfies a fourth back projection condition. The fourth back projection condition is a condition that a plurality of solid color regions of the pattern image are captured in an image captured by a camera 2 which will be described below. The predetermined area does not necessarily have to be an area of a surface that satisfies only one of the first back projection condition, the second back projection condition, the third back projection condition, and the fourth back projection condition. The predetermined area may be, for example, an area of a surface that satisfies a plurality of conditions among the first back projection condition, the second back projection condition, the third back projection condition, and the fourth back projection condition. The predetermined area may be, for example, an area of a surface that satisfies the third back projection condition and the fourth back projection condition.

Since the pattern image satisfies the first pattern image condition, many high frequency components are included in an amplitude spectrum of the pattern image. Therefore, a change in position, orientation, or shape of the pattern image is more easily detected than in an image that does not satisfy the first pattern image condition. A more detailed description of the pattern image will be given below.

The content image is an image different from the pattern image and is an image that a user of the projection system 100 wishes an onlooker to be able to visually recognize. Therefore, the number of times the content image is projected onto the projection surface 90 in a unit time is larger than that of the pattern image. Since the content image is projected onto the projection surface 90 a larger number of times than the pattern image is, the user can more easily visually recognize the content image as compared with the pattern image. The content image is projected, for example, at (⅚) times of a frame rate in a unit time, and the pattern image is projected, for example, at (⅙) times the frame rate in the unit time. A plurality of content images projected in the unit time do not necessarily have to be all the same. For example, the images may be a plurality of different images visually recognized by the onlooker as content images that the user of the projection system 100 wishes the onlooker to visually recognize due to an afterimage effect.

When the three-dimensional state of the projection surface 90 has changed, the projection system 100 projects a content image of which position, orientation, or shape has been changed like the projection surface 90 onto the projection surface 90.

The projection system 100 includes a projector 1, a camera 2, and a control device 3. The projector 1 acquires a plurality of image pieces of data one by one in order. The projector 1 projects still images indicated by image data input in time series onto the projection surface 90 in input order. The projector 1 is, for example, a projector in a digital light processing (DLP) scheme including a light emitting diode (LED) and a digital micromirror device (DMD).

The camera 2 photographs the projection surface 90 at a predetermined photographing timing. The camera 2 transmits image data of an image of a photographing result (hereinafter referred to as a "camera image") to the control device 3. The photographing timing is a timing at which the pattern image is projected onto the projection surface 90. Since the camera 2 photographs the projection surface 90 that is in a state in which the pattern image has been projected, an image in which the pattern image is superimposed on the object texture is captured in the camera image. The photographing timing may be, for example, a timing at which a predetermined signal (hereinafter referred to as a "photographing instruction signal") is sent from the control device 3 or may be a predetermined timing. Hereinafter, the projection system 100 in an example in which the camera 2 photographs the projection surface 90 at a timing at which the photographing instruction signal has been received will be described for simplicity.

Figure 2:
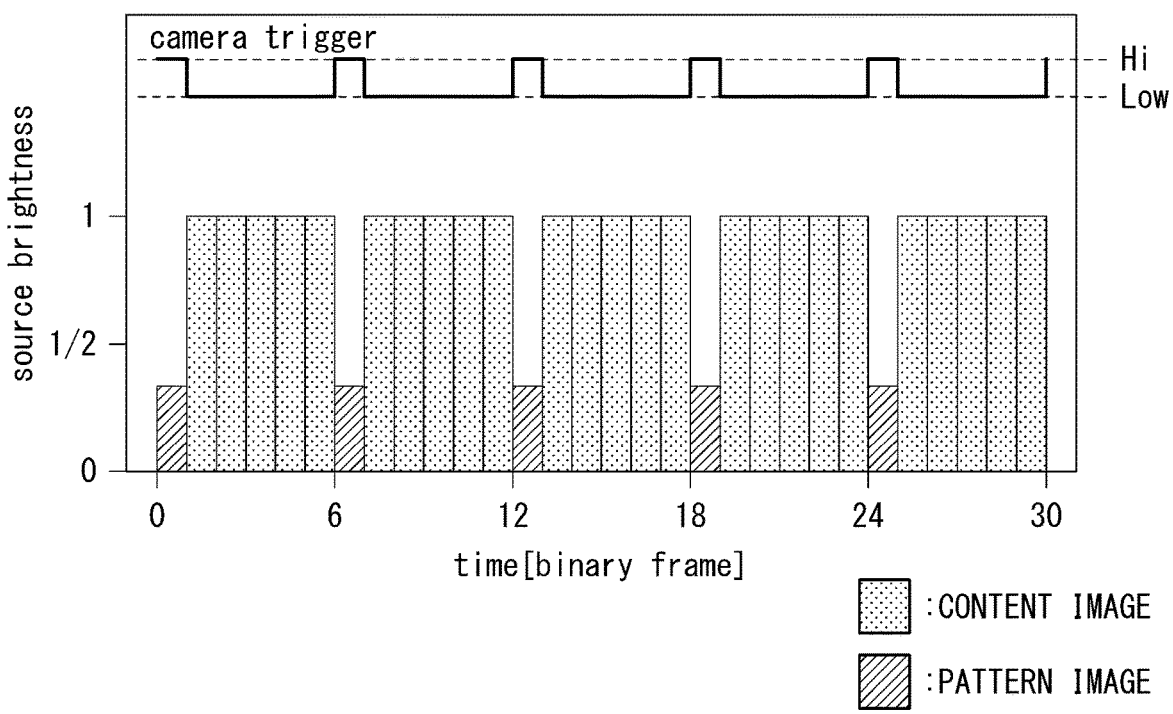
FIG. 2 is a timing chart illustrating an example of an order in which a content image and a pattern image are projected and an example of a predetermined photographing timing in the first embodiment.

FIG. 2 is a timing chart illustrating an example of an order in which the content image and the pattern image are projected and an example of predetermined photographing timings in the first embodiment. In FIG. 2, when the content image is projected five times, the pattern image is projected once. In FIG. 2, a timing chart of a camera trigger shows a timing at which the camera 2 performs photographing. When the camera trigger is "Hi", the camera 2 photographs the projection surface 90. When the camera trigger is "Low", the camera 2 does not photograph the projection surface 90.

The control device 3 transmits the image data to the projector 1. The control device 3 calculates values (hereinafter referred to as "transformation values") for converting a reference content image (hereinafter referred to as an "image deformation") so that the content image projected onto the projection surface 90 has a position, orientation, or shape according to the three-dimensional state of the projection surface 90 on the basis of one camera image. The image deformation is, for example, a homography transformation. The image deformation may be, for example, a radial basis function approximation. The deformation value is, for example, a matrix indicating a homography transformation. The deformation value may be, for example, a coefficient of a radial basis function. The reference content image is a content image projected onto the projection surface 90 when the projection surface 90 is in a first predetermined three-dimensional state (hereinafter referred to as an "initial state") that has been determined in advance. The control device 3 converts the reference content image according to the calculated deformation value. The control device 3 transmits image data of the reference content image after image deformation (hereinafter referred to as a "transmitted content image") to the projector 1. Further, the control device 3 also executes image deformation based on the calculated deformation value on the reference pattern image. The reference pattern image is a pattern image that is projected onto the projection surface 90 when the projection surface 90 is in the initial state. The control device 3 transmits image data of a reference pattern image after image deformation (hereinafter referred to as a "transmission pattern image") to the projector 1 instead of the transmission content image at a predetermined timing. The number of times the control device 3 transmits image data of the transmission pattern image in the unit time is smaller than the number of times image data of the transmission content image is transmitted in the unit time.

The control device 3 includes a control unit 30 including a processor 91, such as a central processing unit (CPU), and a memory 92, which are connected by a bus, and executes a program. The control device 3 functions as a device including a control unit 30, a communication unit 31, and a storage unit 32 through execution of a program. More specifically, the processor 91 reads the program stored in the storage unit 32, and stores the read program in the memory 92. By the processor 91 executing the program stored in the memory 92, the control device 3 functions as a device including the control unit 30, the communication unit 31, and the storage unit 32.

The communication unit 31 includes a communication interface for connecting an own device to the projector 1, the camera 2, and an external device. The communication unit 31 communicates with the projector 1, the camera 2, and the external device wirelessly or via a wire. The communication unit 31 transmits, for example, image data of the transmission content image and the transmission pattern image to the projector 1. The communication unit 31 receives, for example, image data of the camera image transmitted by the camera 2. The communication unit 31 acquires, for example, image data of a reference content image output by an external device. The communication unit 31 outputs various types of acquired information to the control unit 30.

The storage unit 32 is configured by using a non-transitory computer-readable storage medium such as a magnetic hard disk device or a semiconductor storage device. The storage unit 32 stores various types of information regarding the control device 3. The storage unit 32 stores, for example, the image data of the reference content image. The storage unit 32 stores, for example, image data of the reference pattern image. The storage unit 32 stores, for example, the image data of the transmission pattern image. The storage unit 32 stores, for example, the image data of the transmission content image. The image data of the reference content image stored in the storage unit 32 may be information recorded in the storage unit 32 in advance, or may be information recorded in the storage unit 32 after being acquired via the communication unit 31. The storage unit 32 stores, for example, information indicating a history of deformation values. More specifically, the storage unit 32 stores a history of a texture deformation value, a history of a pattern deformation value, and a history of the projector deformation value, which will be described below.

FIG. 3 is a schematic diagram illustrating an example of information indicating the history of the deformation value in the first embodiment. FIG. 3 illustrates an example of information indicating the history of the deformation value stored in the storage unit 32. In the information indicating the history of the deformation value, an item "photographing timing", an item "texture deformation value", an item "pattern deformation value", and an item "camera deformation value" are associated with each other. "Shooting timing" indicates a photographing timing. The "texture deformation value" indicates a texture deformation value calculated on the basis of a camera image captured at a corresponding photographing timing. The "pattern deformation value" indicates a pattern deformation value calculated on the basis of a camera image captured at a corresponding photographing timing. The "camera deformation value" indicates a camera deformation value calculated on the basis of a camera image captured at a corresponding photographing timing. For example, FIG. 3 shows that, in data D101, a texture deformation value calculated on the basis of the camera image captured at a photographing timing of T2 is Vc2, the pattern deformation value is Vp2, and the camera deformation value is Vt2.

The storage unit 32 stores the reference texture image in advance. The reference texture image is an image of a photographing result of the camera 2 photographing the projection surface 90 that is in a second predetermined three-dimensional state (hereinafter referred to as a "reference state"), which is a state of being irradiated with a predetermined light with which the projection surface 90 is irradiated substantially uniformly. The predetermined light is, for example, monochromatic light such as white light emitted by the projector 1. The predetermined light may be, for example, light of indirect illumination in a room in which the projection surface 90 is located. Hereinafter, a case in which the predetermined light is white light emitted by the projector 1 will be described as an example for simplicity. Thus, since the reference texture image is an image of the projection surface 90 that is in a state of being illuminated substantially uniformly, the reference texture image is an image showing a distribution of a reflectance on the projection surface 90. The reference state and the initial state may be the same or may be different.

(Pattern Image)

Details of a pattern image will be described herein. The pattern image may be any pattern image as long as the pattern image satisfies the first pattern image condition. When the projection surface 90 is a flat surface, it is preferable for the pattern image to satisfy, for example, the following second pattern image condition, in addition to the first pattern image condition.

The second pattern image condition includes a condition that solid color regions having different brightness values included in a region of which a distance from an outer circumference is within a predetermined distance (hereinafter referred to as an "outer region") are larger than the solid color regions having different values included in the regions other than the outer region.

The pattern image may further satisfy the following third pattern image condition, in addition to the first pattern image condition and the second pattern image condition.

The third pattern image condition is a condition that, in a region other than the outer region, one or more of a plurality of types of solid color regions having different brightness values are included for each type per unit area, and an area of each solid color region is larger than a predetermined area according to a pattern of an object texture.

When the pattern image is a polygon, the pattern image may satisfy, for example, a fourth pattern image condition, a fifth pattern image condition, and a sixth pattern image condition, in addition to the first pattern image condition, the second pattern image condition, and the third pattern image condition. It is preferable for the pattern image satisfying such conditions to be used in a case in which the projection surface 90 is a flat surface.

The fourth pattern image condition includes a condition that one or a plurality of solid color regions of each type exist in the unit area in the region other than the outer region, and a total area of the solid color regions of each type is substantially the same in the unit area regardless of the type.

The fifth pattern image condition includes a condition that one or a plurality of solid color regions of each type exist in the unit area in a region other than a corner region inside the outer region, and a total area of the solid color regions of each type is substantially the same in the unit area regardless of the type. The corner region is a region having a predetermined size including vertices of the polygon and is a region inside the outer region.

The sixth pattern image condition includes a condition that the corner region is one type of solid color region.

When the pattern image is a circle or an ellipse, the pattern image may satisfy, for example, the fourth pattern image condition, and the following seventh pattern image condition, in addition to the first pattern image condition, the second pattern image condition, the third pattern image condition. It is preferable for the pattern image satisfying such a condition to be used when the projection surface 90 is a flat surface.

The seventh pattern image condition includes a condition that one or a plurality of solid color regions of each type exist in the unit area in the region inside the outer region, and a total area of the solid color regions of each type is substantially the same in the unit area regardless of the type.

Figure 4:
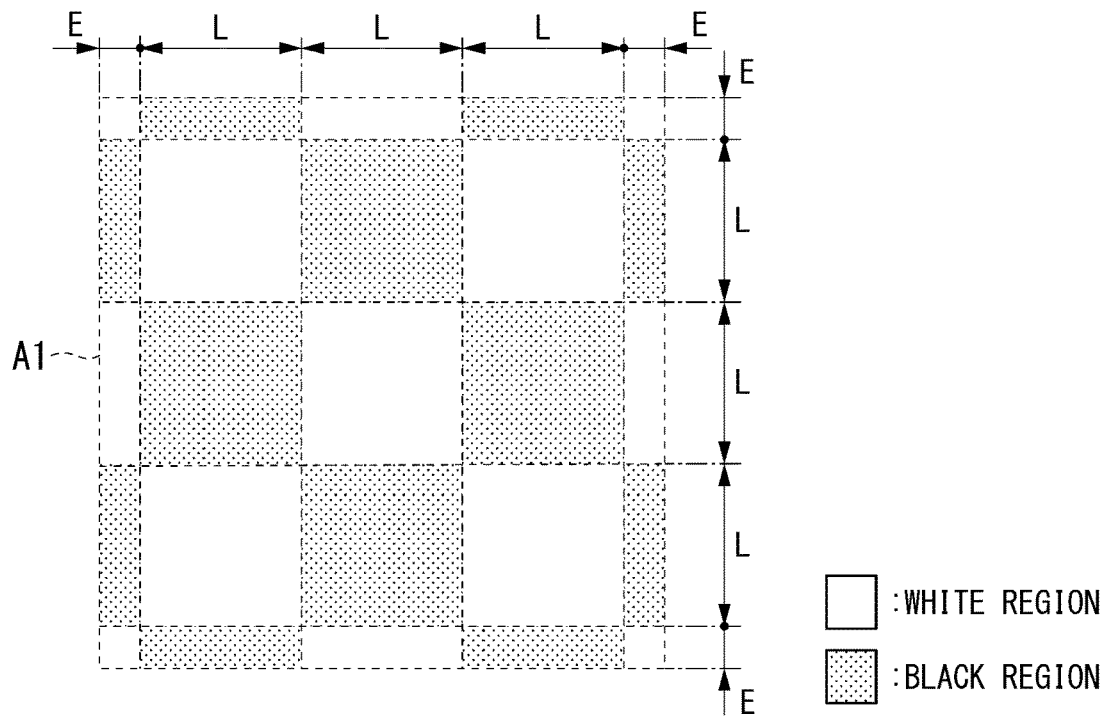
FIG. 4 is a first diagram illustrating an example of a pattern image in the first embodiment.
Figure 5:
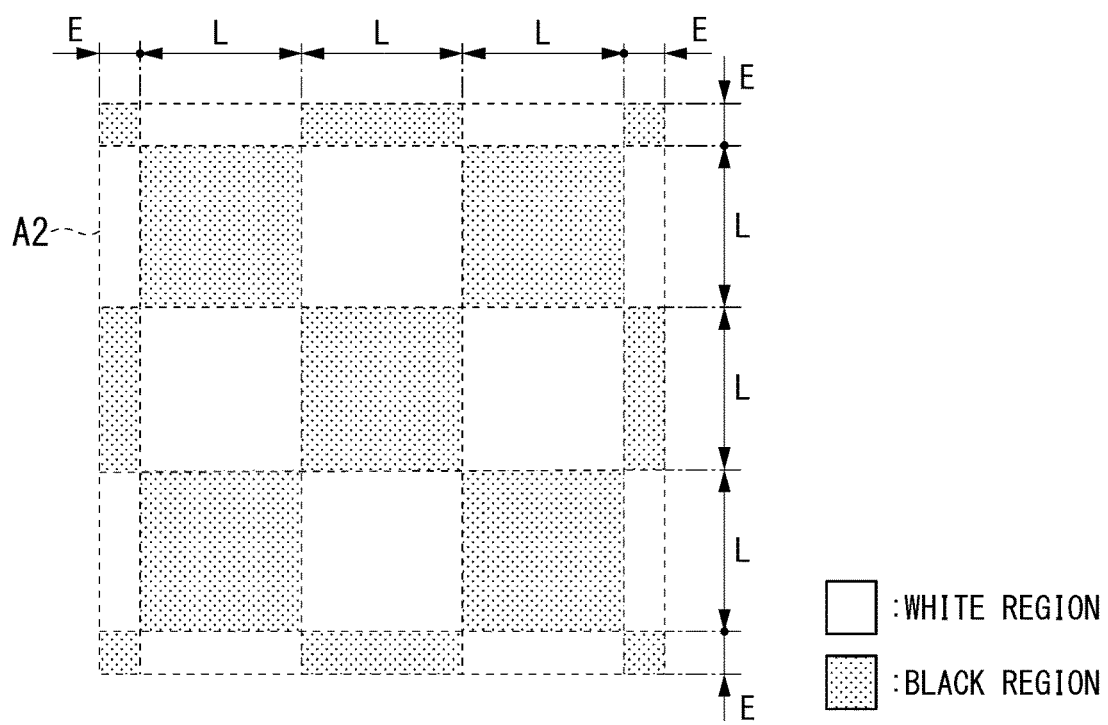
FIG. 5 is a second diagram illustrating an example of the pattern image in the first embodiment.

FIGS. 4 and 5 are diagrams illustrating an example of a pattern image satisfying the pattern image condition in the first embodiment. More specifically, FIG. 4 is a first diagram illustrating an example of a pattern image in the first embodiment. FIG. 4 illustrates a pattern image A1. FIG. 4 illustrates that the pattern image A1 is a square. FIG. 4 illustrates that an outer region of the pattern image A1 is a region having a thickness of E from an outer circumference to an inner side of the pattern image A1. FIG. 4 illustrates that in the outer region of the pattern image A1, a white region and a black region are alternately disposed along the outer circumference of the pattern image A1. The white region is a region having a predetermined brightness value, and the black region is a region having a lower brightness value than the white region. FIG. 4 illustrates that a square region of which one side including vertices of a square is E is a white region. In FIG. 4, a white region of a square of which one side including vertices of the square is E is a corner region of the pattern image A1. When the pattern image A1 is projected onto the projection surface 90, the white region is a region irradiated with light having a predetermined intensity. The black region is a region that is irradiated with light having a weaker intensity than light that is radiated to the white region. The intensity of light radiated to the black region may be any intensity as long as the intensity is weaker than the intensity of the light radiated to the white region, and the intensity may be, for example, zero.

FIG. 4 illustrates that a white region in the outer region of the pattern image A1 is a rectangle having a length of L and a thickness of E or a square having a side length of E. The length L is longer than E. FIG. 4 illustrates that a black region in the outer region of the pattern image A1 is a rectangle having a length of L and a thickness of E. FIG. 4 illustrates that in a region other than the outer region of the pattern image A1, a white region of a square having a side having a length of L and a black region of a square having a side having a length of L are alternately disposed.

FIG. 5 is a second diagram illustrating an example of a pattern image in the first embodiment. FIG. 5 illustrates a pattern image A2. The pattern image A2 is a pattern image in which a white region and a black region in the pattern image A1 illustrated in FIG. 4 are inverted. That is, shapes of the pattern image A1 and the pattern image A2 are the same. A sum of a brightness value of each pixel in the pattern image A1 (one side) and a brightness value of each corresponding pixel in the pattern image A2 (the other side) is substantially the same regardless of the pixels. In FIG. 5, a black region of a square of which one side including vertices of the square is E is a corner region of the pattern image A2. Now, a detailed description of the pattern image ends.

Figure 6:
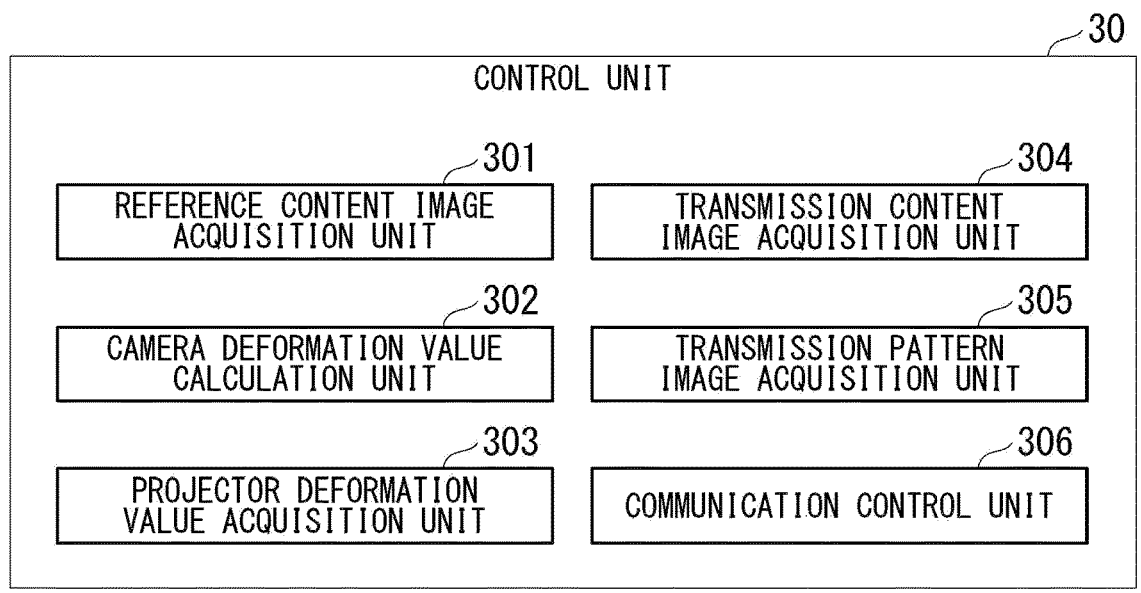
FIG. 6 is a diagram illustrating an example of a functional configuration of a control unit 30 in the first embodiment.

FIG. 6 is a diagram illustrating an example of a functional configuration of the control unit 30 in the first embodiment. The control unit 30 includes a reference content image acquisition unit 301, a camera deformation value calculation unit 302, a projector deformation value acquisition unit 303, a transmission content image acquisition unit 304, a transmission pattern image acquisition unit 305, and a communication control unit 306.

The reference content image acquisition unit 301 acquires the image data of the reference content image. The reference content image acquisition unit 301 may read the image data of the reference content image recorded in the storage unit 32, or may acquire the image data of the reference content image input via the communication unit 31.

Each time the camera image is acquired, the camera deformation value calculation unit 302 calculates a deformation value indicating change in position, orientation, or shape of the projection surface 90 (hereinafter referred to as a "texture deformation value") as seen from the camera 2 on the basis of the camera image. More specifically, the camera deformation value calculation unit 302 calculates the texture deformation value on the basis of an image of the object texture (hereinafter referred to as an "object texture image") that is captured in the camera image each time the camera image is acquired. The camera deformation value calculation unit 302 may calculate the texture deformation value using any method as long as the method can calculate the texture deformation value. For example, the camera deformation value calculation unit 302 may calculate the texture deformation value through convergence calculation for updating the deformation value according to a predetermined rule using a predetermined deformation value as an initial condition. In this case, a convergence condition of the convergence calculation is a condition that the degree of matching in target location between the object texture image captured in the camera image and the reference texture image after image deformation is equal to or higher than a predetermined degree. The target location is a location captured in the camera image when the reference texture image after image deformation is projected onto the projection surface 90. The degree of matching is, for example, a small sum of squared differences in the brightness values between the object texture image and the reference texture image after image deformation. The camera deformation value calculation unit 302 may adjust brightness of the object texture during the convergence calculation. Specifically, the brightness of the object texture may be divided by an average value of brightness values of all pixels of the reference texture image during the convergence calculation.

Since a deviation of the brightness value between the reference texture image and the object texture becomes small by doing so, it is possible to reduce a likelihood of the convergence calculation converging due to an inappropriate saddle point or a local solution, or a likelihood of the convergence calculation diverging without convergence. The calculated texture deformation value may be recorded in the storage unit 32.

For example, when the pattern image is an image having two types of regions including a white region and a black region, the camera deformation value calculation unit 302 may calculate the texture deformation value using each position not in the entire surface of the projection surface 90 but in a region satisfying the following target location condition as the target location. The target location condition is a condition of a region in which a white region of a pre-stage pattern image is located at a previous photographing timing. The pre-stage pattern image is a pattern image that is captured in the camera image captured at the previous photographing timing. For example, the target location may not be all positions in the white region of the pre-stage pattern image, and may be, for example, a part of the white region of the pre-stage pattern image. More specifically, the target location may be, for example, a region inside the white region of the pre-stage pattern image, and may be a position in a region located at a position away from an outer circumference of the white region by a distance according to a speed of movement or rotation of the projection surface 90 and an interval between the photographing timings. The distance is, for example, v×Δt, in which v is the speed of movement of the projection surface 90 and Δt is the interval between photographing timings. The target location may be a black region instead of the white region, or may be a part of the black region. The target location may be the white region and the black region, or may be a part of the white region and a part of the black region.

At a point in time when the camera deformation value calculation unit 302 acquires the texture deformation value, a determination is not made as to a place in a newly acquired camera image at which the pattern image is located. Therefore, when the target location is an entire region of the solid color region, it is difficult to determine whether a region indicated by each pixel in a target region captured in the camera image is a white region or a black region of the pattern image. On the other hand, when the target location is a part of the solid color region, the target location is a white region of the pattern image. Therefore, it is possible to calculate the texture deformation value more accurately than when the target location is an entire surface of the solid color region.

Figure 7:
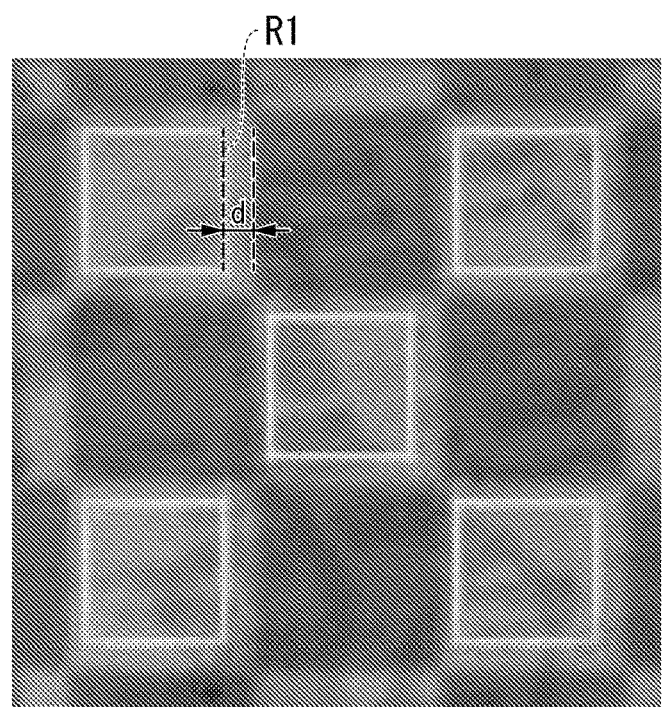
FIG. 7 is a diagram illustrating an example of a target location in the first embodiment.

FIG. 7 is a diagram illustrating an example of a target location in the first embodiment. FIG. 7 illustrates an example of a camera image of an experimental result. In FIG. 7, the target location is each position in a region R1. A distance d is a distance between an outer circumference of the region R1 and the outer circumference of the white region.

The image deformation based on the texture deformation value is a conversion for matching the object texture image of the target location in the camera image with an image of the target location in the reference texture image at a degree equal to or higher than a predetermined degree of matching. Therefore, the texture deformation value indicates a correspondence relationship between the pixels of the camera image and the reference texture image.

The projector deformation value acquisition unit 303 acquires the projector deformation value on the basis of the camera image and the texture deformation value. The projector deformation value is a deformation value indicating an image deformation for converting the reference content image into the transmission content image. The projector deformation value acquisition unit 303 first executes pattern image extraction processing, for example. The pattern image extraction processing is processing of extracting the pattern image from the camera image. The pattern image extraction processing is, for example, the following processing. The projector deformation value acquisition unit 303 first executes image deformation based on the texture deformation value for the camera image. Then, the projector deformation value acquisition unit 303 divides a brightness value of each pixel of the camera image after image deformation by a brightness value of a corresponding pixel of the reference texture image using a correspondence relationship between the pixels indicated by the texture deformation value. A reason for the pattern image being extracted by division is as follows.

A distribution of the reflectance on the projection surface 90 is superimposed on the pattern image captured in the camera image. Therefore, a brightness value of an image captured in the camera image is substantially proportional to a value obtained by multiplying a sum of a brightness value of a radiated pattern image and intensity of indoor background light by the reflectance. The indoor background light is substantially uniform on the projection surface 90 regardless of a position. On the other hand, the reference texture image is substantially proportional to a product of intensity of uniform light radiated when the reference texture image has been acquired by the reflectance. Therefore, when the brightness value of each pixel of the camera image is divided by a corresponding brightness value of each pixel of the reference texture image, a term of the reflectance disappears, and a magnitude relationship between the pixels as a result of the division matches a magnitude relationship between pixels of the brightness value of the pattern image. This is a reason for the pattern image being extracted by the division.

Then, the projector deformation value acquisition unit 303 acquires a deformation value indicating an image deformation for making a degree of matching between the reference pattern image and the extracted pattern image equal to or higher than a predetermined degree. For example, the projector deformation value acquisition unit 303 acquires a deformation value indicating an image deformation for minimizing a sum of squared difference between the brightness value of the reference pattern image and the brightness value of the extracted pattern image. The acquired deformation value is a pattern deformation value.

Then, the projector deformation value acquisition unit 303 acquires the projector deformation value on the basis of the acquired pattern deformation value and the projector deformation value at the previous photographing timing. The projector deformation value acquisition unit 303 first acquires positions of the camera reference point and the projector reference point in order to acquire the projector deformation value. The camera reference point is a point at which a plurality of reference points (hereinafter referred to as "pattern reference points") defined on the pattern image in advance are projected on the camera image on the basis of the pattern deformation value. The projector reference point is a point at which the pattern reference point has been projected onto a projector image on the basis of the projector deformation value at the previous photographing timing. The projector image is an image that is projected by the projector 1. The camera reference point and the projector reference point are associated with different projector reference points for each camera reference point in advance.

The projector deformation value acquisition unit 303 acquires a deformation value (hereinafter referred to as a "target deformation value") indicating an image deformation (hereinafter referred to as a "target image deformation") in which a projection destination of each camera reference point matches a corresponding projector reference point. The projector deformation value acquisition unit 303 minimizes, for example, a sum of squares of a distance between the projection destination of the camera reference point and the corresponding projector reference point through convergence calculation. The image deformation for minimizing the sum of the squares is a target image deformation, and the deformation value indicating the image deformation for minimizing the sum of the squares is the target deformation value. The target image deformation is, for example, a homography transformation. The target image deformation may be, for example, an affine transformation for each mesh region when an image is divided into triangular meshes.

Using the image deformation from the camera image obtained in this way to the projector image, it is possible to map the texture image captured on the camera image onto the projector image. The projector deformation value acquired by the projector deformation value acquisition unit 303 indicates an image deformation for matching a predetermined position of the content image with a predetermined position of the texture image mapped onto the projector image. The projector deformation value acquisition unit 303 acquires the projector deformation value in the same procedure as the target deformation value.

The transmission content image acquisition unit 304 acquires the image data of the transmission content image on the basis of the reference content image and the projector deformation value. Specifically, the transmission content image acquisition unit 304 executes the image deformation indicated by the acquired projector deformation value for the reference content image. The reference content image after the image deformation based on the projector deformation value is performed is the transmission content image.

The transmission pattern image acquisition unit 305 acquires the image data of the transmission pattern image on the basis of the reference pattern image and the projector deformation value. Specifically, the transmission pattern image acquisition unit 305 executes the image deformation indicated by the projector deformation value for the reference pattern image. The reference pattern image after the image deformation indicated by the projector deformation value has been performed is the transmission pattern image.

Figure 8A:
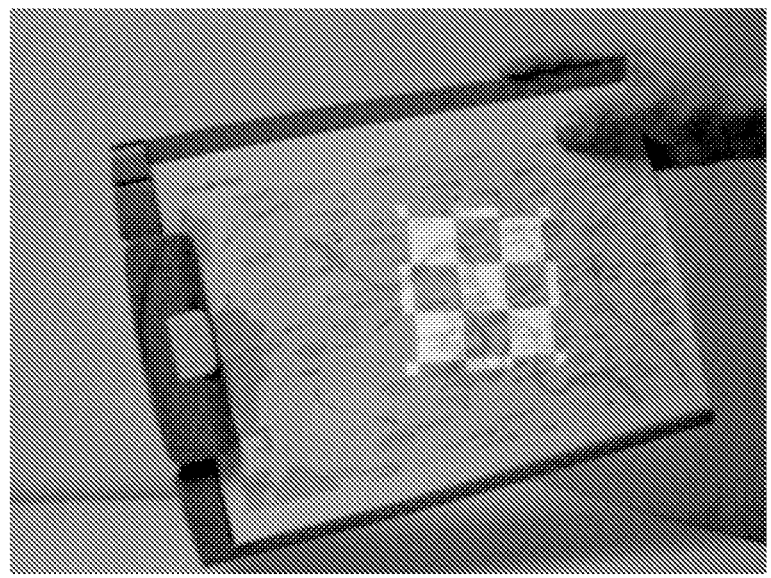
FIG. 8A is a diagram illustrating an example of experimental results showing a pattern image before acquisition of the projector deformation value
Figure 8B:
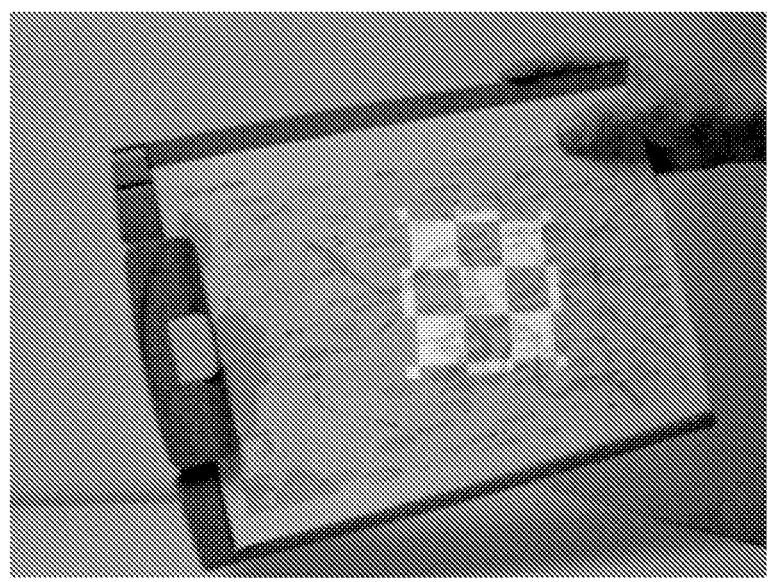
FIG. 8B is a diagram illustrating an example of experimental results showing a pattern image after execution of the image deformation indicated by the projector deformation value.

FIG. 8A and FIG. 8B are examples of experimental results showing a pattern image before projector deformation value acquisition and a pattern image after the execution of the image deformation indicated by the projector deformation value in the first embodiment. FIG. 8A illustrates a pattern image before acquisition of the projector deformation value, which is captured in the camera image. FIG. 8B is a pattern image after execution of the image deformation indicated by the projector deformation value, which is captured in the camera image. FIG. 8A and FIG. 8B illustrate that the pattern image also moves according to the movement of the projection surface 90.

The communication control unit 306 transmits the transmission content image and the transmission pattern image to the projector 1 via the communication unit 31. The communication control unit 306 transmits a photographing instruction signal to the camera 2 at a timing at which the transmission pattern image has been transmitted.

Figure 9:
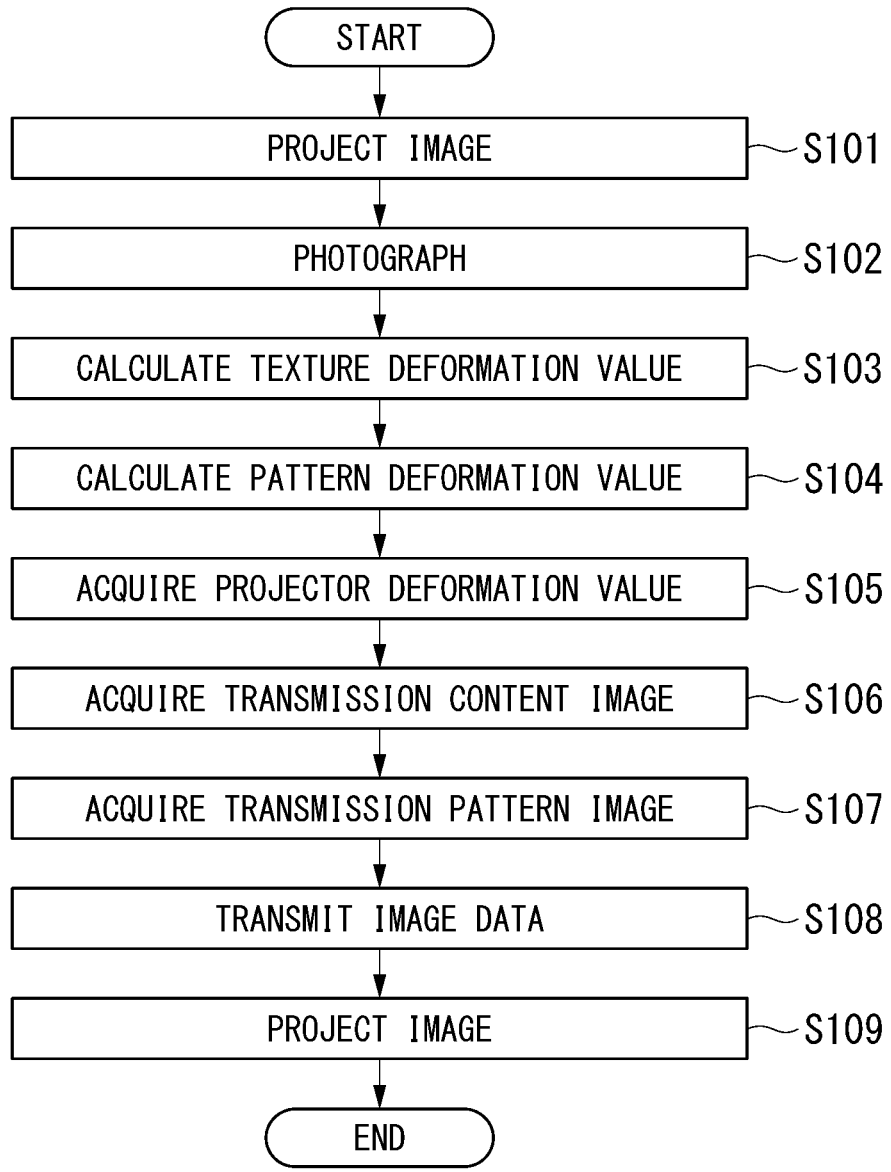
FIG. 9 is a flowchart illustrating an example of a flow of processing that is executed by the projection system 100 in the first embodiment.

FIG. 9 is a flowchart illustrating an example of a flow of processing that is executed by the projection system 100 in the first embodiment. The projector 1 projects the still images indicated by the image data input in time series onto the projection surface 90 in input order (step S101). The camera 2 photographs the projection surface 90 at a photographing timing (step S102). Then, the camera deformation value calculation unit 302 calculates the texture deformation value on the basis of the camera image of a photographing result of the camera 2 (step S103). The projector deformation value acquisition unit 303 then acquires the pattern deformation value on the basis of the camera image and the texture deformation value (step S104). Then, the projector deformation value acquisition unit 303 acquires the projector deformation value on the basis of the pattern deformation value acquired in step S104 and the projector deformation value at the previous photographing timing (step S105). Then, the transmission content image acquisition unit 304 acquires the image data of the transmission content image on the basis of the reference content image and the projector deformation value (step S106). Then, the transmission pattern image acquisition unit 305 acquires the image data of the transmission pattern image on the basis of the reference pattern image and the projector deformation value (step S107). Then, the communication control unit 306 transmits the image data of the transmission content image and the image data of the transmission pattern image to the projector 1 via the communication unit 31 in a predetermined order (step S108). The projector 1 projects the transmission content image or the transmission pattern image onto the projection surface 90 in order in which the image data has been received (step 109). After step S109, the processes of steps S102 to S109 are repeated until a predetermined end condition is satisfied. The predetermined end condition is, for example, a condition that power is not supplied to the control device 3.

Since the projection system 100 configured in this way controls the content image to be projected on the basis of the pattern image satisfying the first pattern image condition, it is possible to project the content image according to a movement, rotation, or deformation of the projection surface 90 on the basis of one pattern image. Therefore, the projection system 100 can curb position deviation on the projection surface of a plurality of images that are sequentially projected on the moving projection surface in a technology for moving the image projected onto the projection surface according to the movement of the projection surface.

Second Embodiment

When performance of the projector 1 or the camera 2 included in the projection system 100 does not satisfy predetermined performance, position deviation on the projection surface of the images becomes larger than a case in which the performance of the device satisfies the predetermined performance. For example, when a lens of the projector 1 has a predetermined magnitude or more of distortion or when there is a delay of a predetermined time or more (hereinafter referred to as a "delay time $\Delta t$") until the projector 1 projects an image after the camera 2 performs photographing, the position deviation becomes large. Further, even when the projection surface 90 is not a flat surface, the position deviation becomes large. Specifically, the position deviation is a deviation between a virtual image and the image projected onto the projection surface 90 (hereinafter referred to as an "image deviation"). The virtual image is an image that is displayed on the projection surface 90 when the projection surface 90 is a flat surface and the performance of the projector 1 or the camera 2 satisfies the predetermined performance. Therefore, the control unit 30 may further include a correction unit 307 in order to correct the image deviation.

Figure 10:
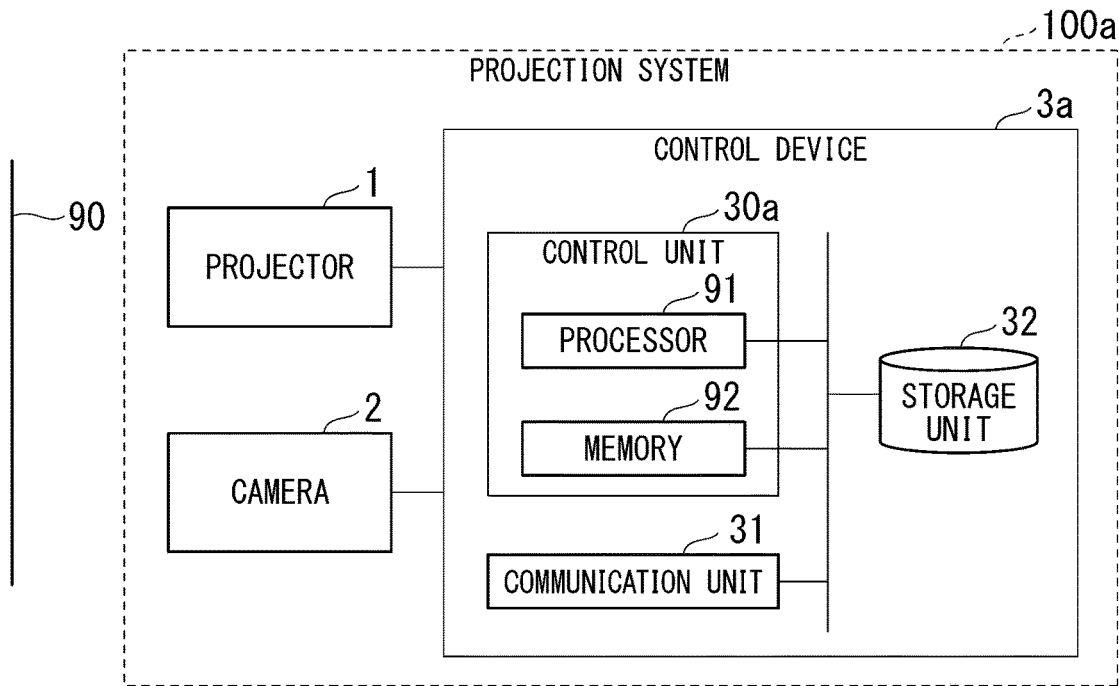
FIG. 10 is a diagram illustrating an example of a system configuration of a projection system 100 of the embodiment in a second embodiment.

FIG. 10 is a diagram illustrating an example of a system configuration of a projection system 100a of a second embodiment. Hereinafter, a system having the same function as the projection system 100 is denoted by the same reference sign as that in FIG. 1, and a description thereof will be omitted.

The projection system 100a differs from the projection system 100 in that a control device 3a is included instead of the control device 3. The control device 3a differs from the control device 3 in that a control unit 30a is included instead of the control unit 30. The control unit 30a differs from the control unit 30 in that the correction unit 307 is further included in addition to each functional unit included in the control unit 30.

Figure 11:
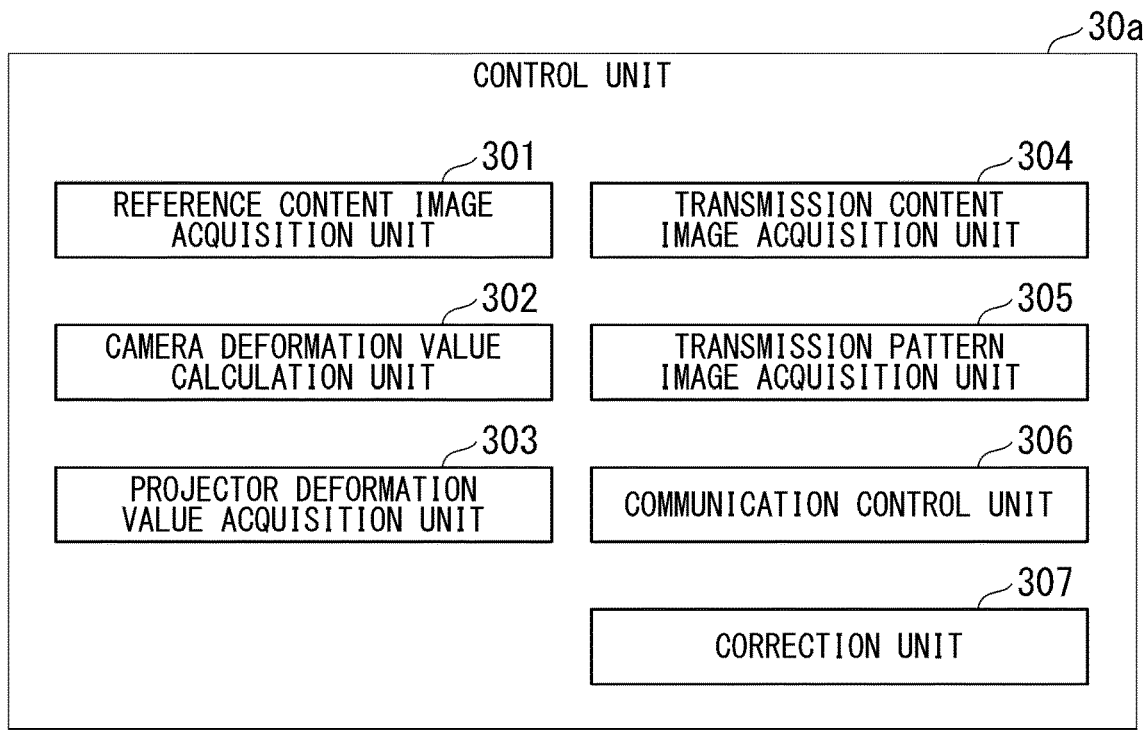
FIG. 11 is a diagram illustrating an example of a functional configuration of a control unit 30a in the second embodiment.

FIG. 11 is a diagram illustrating an example of a functional configuration of the control unit 30a in the second embodiment. Hereinafter, a unit having the same function as the control unit 30 is denoted by the same reference sign as that in FIG. 6, and a description thereof will be omitted.

The correction unit 307 changes the projector deformation value to a value for reducing the image deviation. Each time the camera image is captured, the correction unit 307 acquires a value for correcting the projector deformation value (hereinafter referred to as a "projector deformation correction value") acquired by the projector deformation value acquisition unit 303 on the basis of a projector deformation value at one more previous photographing timing and a projector deformation value at a previous photographing timing. The projector deformation correction value is a value for reducing the image deviation. Specifically, the correction unit 307 acquires a value for causing four predetermined positions (hereinafter referred to as "second control points") on the pattern image projected onto the projection surface 90 to be closer to four predetermined positions on the projection surface 90 (hereinafter referred to as "first control points"), as the projector deformation correction value. The projector deformation value at the one more previous photographing timing is a camera deformation value acquired on the basis of a camera image captured at the one more previous photographing timing. The projector deformation value at the previous photographing timing is a camera deformation value acquired on the basis of the camera image captured at the previous photographing timing.

Figure 12:
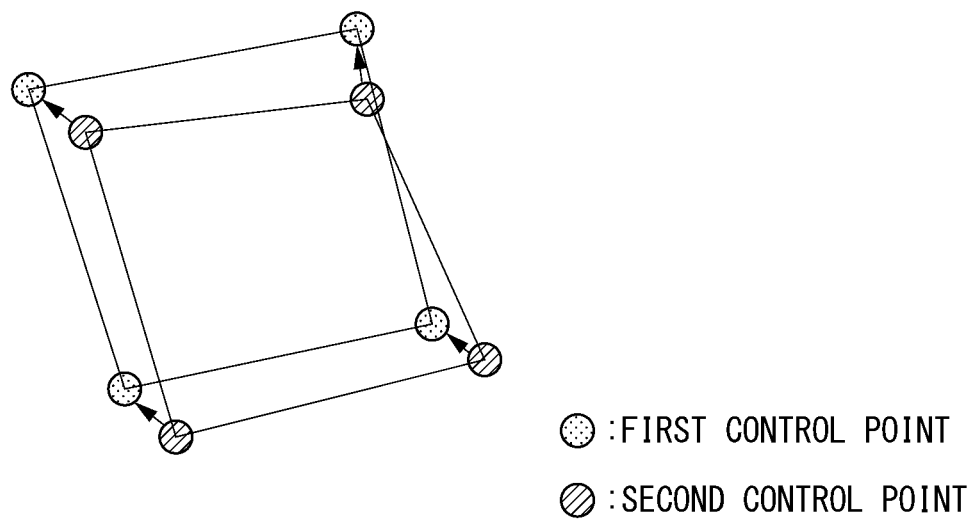
FIG. 12 is an illustrative diagram illustrating a first control point and a second control point in the second embodiment.

FIG. 12 is an illustrative diagram illustrating the first control point and the second control point in the second embodiment. In FIG. 12, an arrow indicates that the second control point moves to the first control point. FIG. 12 illustrates that a plurality of second control points do not move to one first control point.

Figure 13:
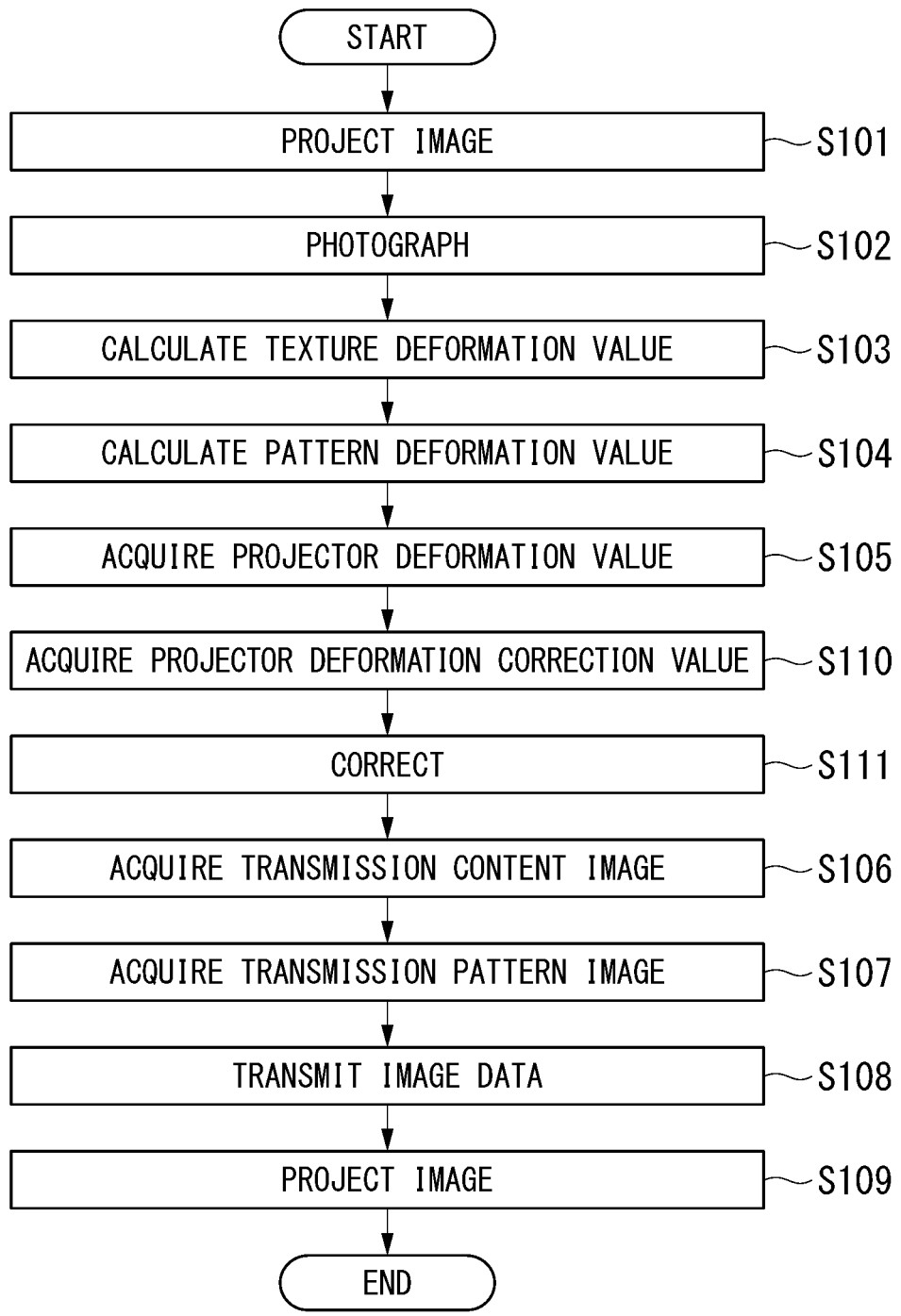
FIG. 13 is a flowchart illustrating an example of a flow of processing that is executed by a projection system 100a in the second embodiment.

FIG. 13 is a flowchart illustrating an example of a flow of processing that is executed by the projection system 100a in the second embodiment. Hereinafter, the same processing as that performed by the projection system 100 is denoted by the same reference signs as those in FIG. 9, and description thereof will be omitted.

After step S105, the correction unit 307 acquires the projector deformation correction value on the basis of the projector deformation value at the one more previous photographing timing and the projector deformation value at the previous photographing timing (step S110). Next, the correction unit 307 corrects the projector deformation value acquired in step S104 using the acquired projector deformation correction value (step S111). The correction is to execute a predetermined calculation dependent on a definition of the projector correction value on the projector deformation value. The predetermined calculation may be, for example, to multiply the projector deformation value by the projector deformation correction value, or to add the projector deformation correction value to the projector deformation value. After step S111, the process of step S106 is executed using the corrected projector deformation value.

The projection system 100a of the second embodiment configured in this way acquires the projector deformation correction value and corrects the projector deformation value using the acquired projector deformation correction value. Therefore, the projection system 100a can curb the image deviation dependent on the fact that the projector 1 or the camera 2 does not satisfy the predetermined performance or the projection surface 90 is not a flat surface as compared with the projection system 100 and project an image.

Modification Example

The transmission content image acquisition unit 304 does not necessarily have to acquire a projector matrix on the basis of the pattern image extracted after the pattern image is extracted. The transmission content image acquisition unit 304 may calculate the projector deformation value using an edge of the pattern image.

The correction unit 307 may be, for example, a Smith predictor. Further, the correction unit 307 does not necessarily have to use four points on the projection surface 90 when the projector deformation correction value is acquired. Five points or more may be used or less than four points may be used.

For the content image and the pattern image, one type of pattern image does not necessarily have to be projected in the order illustrated in FIG. 2. For example, two types of pattern images having a white region and a black region, which are two types of pattern images in which the white region and the black region are inverted, may be continuously projected once. The two types of pattern images are, for example, two types of pattern images including the pattern image illustrated in FIG. 4 (hereinafter referred to as a "first pattern image"), and the pattern image illustrated in FIG. 5 (hereinafter referred to as a "second pattern image").

Figure 14:
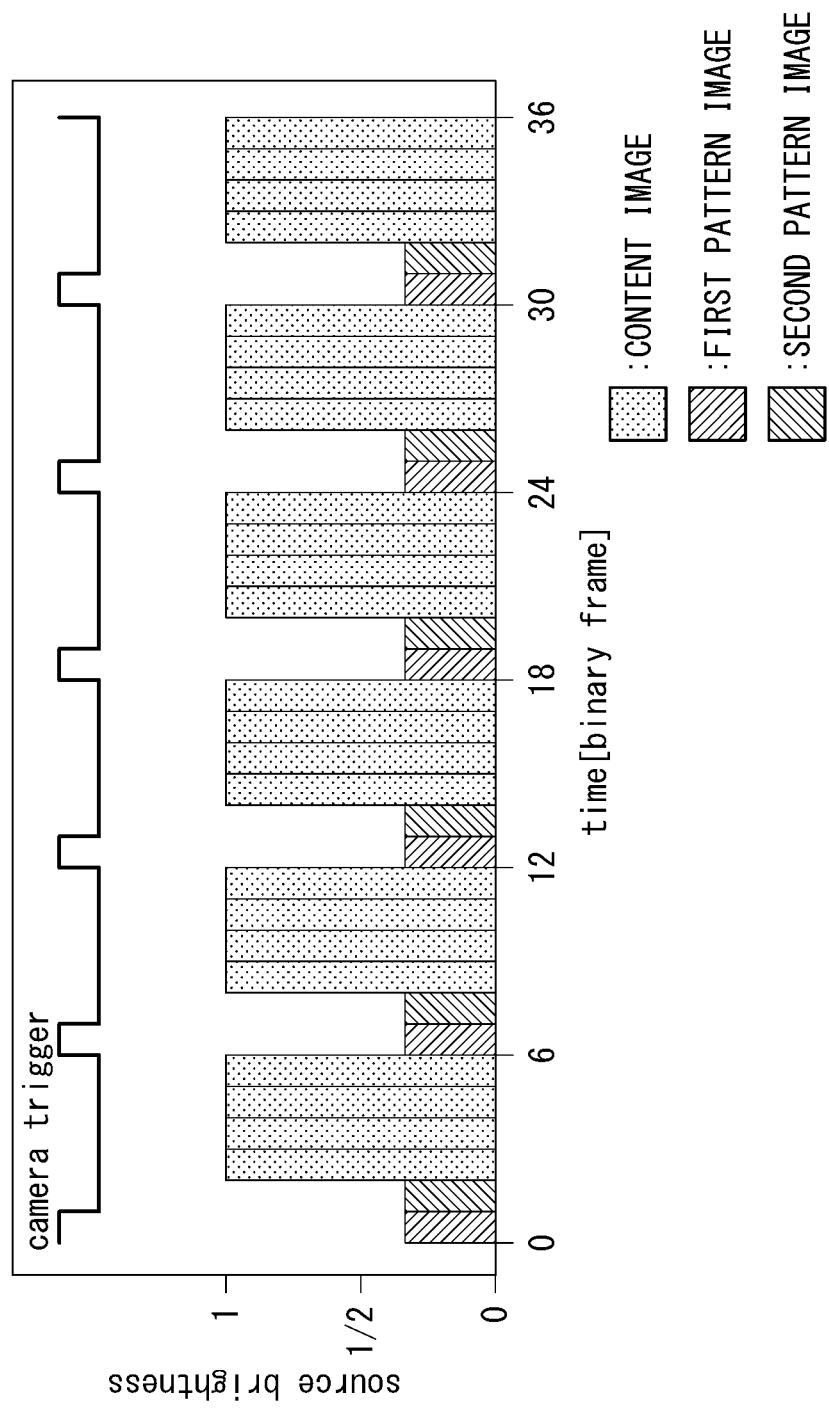
FIG. 14 is a first timing chart illustrating an example of an order in which content images and pattern images are projected and an example of a predetermined photographing timing in a modification example.

FIG. 14 is a first timing chart illustrating an example of order in which the content image and the pattern image are projected and an example of a predetermined photographing timing in the modification example. FIG. 14 illustrates that, when the content image is projected five times, the first pattern image is projected once, and then the second pattern image is projected once. FIG. 14 illustrates that the camera 2 captures the first pattern image and does not capture the second pattern image. By the first pattern image and the second pattern image being projected in this way, an average image of the first pattern image and the second pattern image appears to be projected onto the projection surface 90 for a user. Therefore, it becomes difficult for the user to visually recognize patterns of the first pattern image and the second pattern image.

Figure 15:
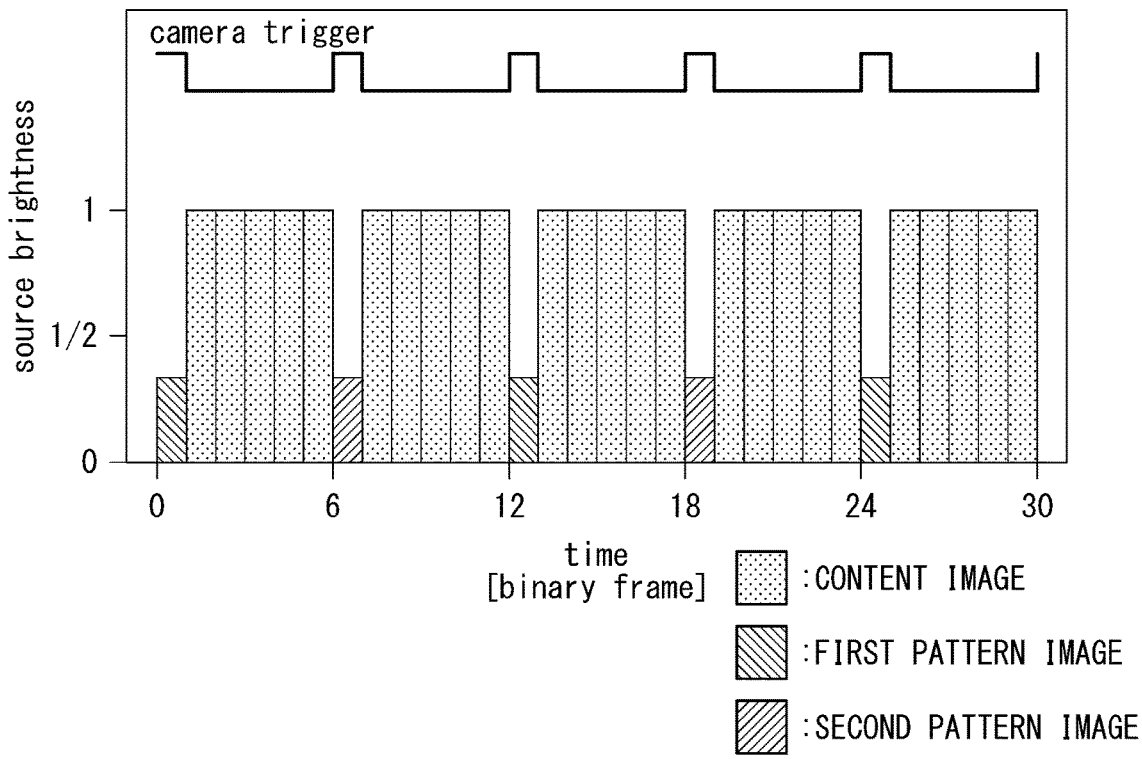
FIG. 15 is a second timing chart illustrating an example of an order in which the content image and the pattern image are projected and an example of a predetermined photographing timing in the modification example.

When two types of pattern images including the first pattern image and the second pattern image are projected, the first pattern image and the second pattern image may be switched and projected at each timing at which the pattern image is projected, as illustrated in FIG. 15 below.

FIG. 15 is a second timing chart illustrating an example of order in which the content image and the pattern image are projected and an example of a predetermined photographing timing in the modification example. FIG. 15 illustrates that, when the content image is projected five times, the first pattern image is projected once, and then when the content image is captured five times, the second pattern image is projected once. By the first pattern image and the second pattern image being alternately projected in this way, an average image of the first pattern image and the second pattern image appears to be projected onto the projection surface 90 for a user. Therefore, it becomes difficult for the user to visually recognize the patterns of the first pattern image and the second pattern image.

The projection systems 100 and 100a, for example, may project a red image, a green image, and a blue image of one content image onto the projection surface 90 while sequentially switching between the images. The red image is an image indicating a red brightness value of each pixel of the content image, and is an image that is projected onto the projection surface by red light. The green image is an image indicating a green brightness value of each pixel of the content image, and is an image that is projected onto the projection surface by red light. The blue image is an image indicating a blue brightness value of each pixel of the content image, and is an image that is projected onto the projection surface by blue light.

The first pattern image and the second pattern image may be any pattern images as long as the pattern images satisfy the following two conditions. One of the conditions is a condition that the shapes are the same. The other of the conditions is a condition that a sum of a brightness value of each pixel in the first pattern image and a brightness value of each corresponding pixel in the second pattern image is substantially the same regardless of the pixels.

Even when the position, orientation or shape of the projection surface 90 does not necessarily change, the projection systems 100 and 100a can project content image according to a change in a positional relationship among the projection surface 90, the projector 1, and the camera 2 onto the projection surface 90 in a case in which the positional relationship changes. The case in which the positional relationship among the projection surface 90, the projector 1, and the camera 2 changes is, for example, a case in which the position or orientation of the projector 1 changes or a case in which the position or orientation of the camera 2 changes.

The pattern image on the projection surface 90 is located in a region in which the object texture is formed or drawn. Further, a size of the pattern image on the projection surface 90 is larger than the region on the projection surface 90 seen by the onlooker. The content image may be a color image or a binary image.

The light emitted by the projector 1 to project an image may be visible light, may be X-rays, may be ultraviolet light, may be infrared light, or may be terahertz waves. The camera 2 may be capable of receiving not only visible light but also X-rays, ultraviolet light, infrared rays, and terahertz waves.

All or some of respective functions of the control devices 3 and 3a may be realized by using hardware such as an application specific integrated circuit (ASIC), a programmable logic device (PLD), or a field programmable gate array (FPGA). A program may be recorded on a computer-readable recording medium. The computer-readable recording medium is, for example, a flexible disk, a magneto-optical disk, a portable medium such as a ROM or a CD-ROM, or a storage device such as a hard disk built in a computer system. The program may be transmitted via a telecommunication line.

The control devices 3 and 3a may be mounted by using a plurality of information processing devices that are communicatively connected via a network. In this case, each functional unit included in the control device 3 may be distributed and mounted in a plurality of information processing devices. For example, the reference content image acquisition unit 301, the camera deformation value calculation unit 302, the projector deformation value acquisition unit 303, the transmission content image acquisition unit 304, the transmission pattern image acquisition unit 305, the communication control unit 306, and the correction unit 307 may be mounted on different information processing devices.

The transmission content image acquisition unit 304 is an example of a first conversion unit. The transmission pattern image acquisition unit 305 is an example of a second conversion unit. The control device 3 is an example of a projection system control device.

Although the embodiment of the present invention has been described in detail with reference to the drawings, a specific configuration is not limited to this embodiment, and includes designs or the like within a range that does not depart from the gist of the present invention. For example, the transmission content image acquisition unit 304 and the transmission pattern image acquisition unit 305 do not have to be different functional units. For example, the control unit 30 or 30a may include a transmission image acquisition unit 308 instead of the transmission content image acquisition unit 304 and the transmission pattern image acquisition unit 305. The transmission image acquisition unit 308 executes processing that is executed by the transmission content image acquisition unit 304 and processing that is executed by the transmission pattern image acquisition unit 305.

Figure 16:
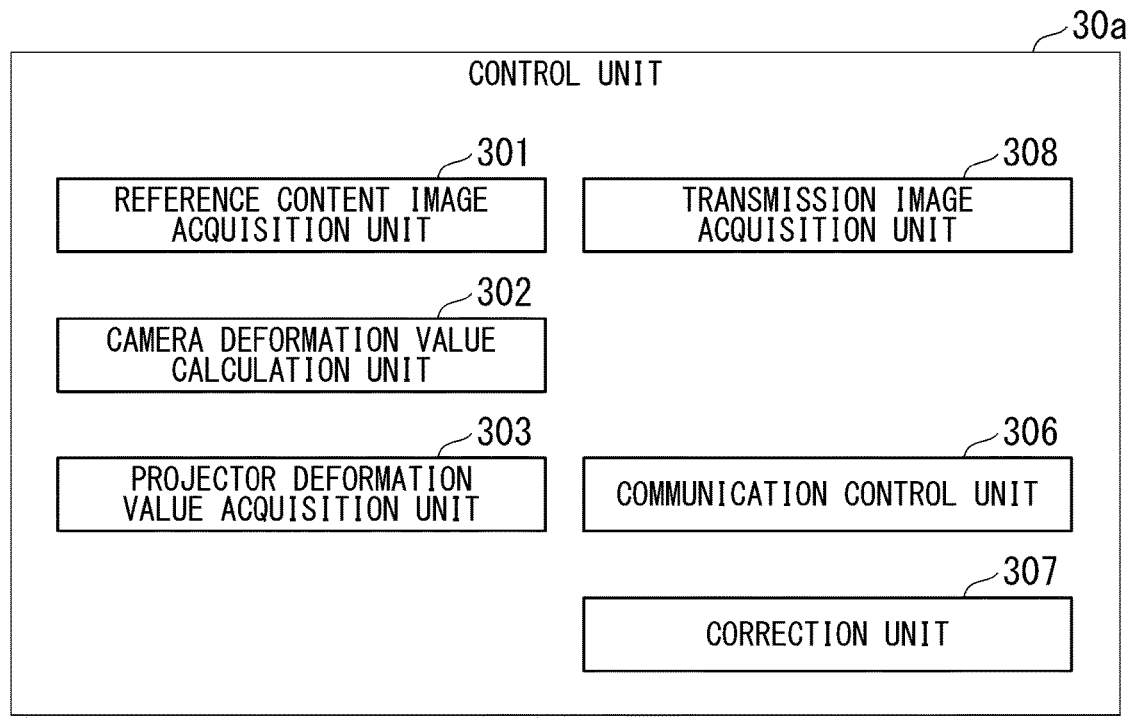
FIG. 16 is a diagram illustrating an example of a transmission image acquisition unit 308 in the modification example.

FIG. 16 is a diagram illustrating an example of the transmission image acquisition unit 308 in the modification example. Although FIG. 16 illustrates the control unit 30a including the transmission image acquisition unit 308 for simplicity, the control unit 30 may include the transmission image acquisition unit 308.

The first pattern image condition does not have to necessarily include two conditions including a condition that a plurality of types of solid color regions having different brightness values are included and a condition that the area of at least one of the plurality of types of solid color regions is larger than a predetermined area. The first pattern image condition may be a condition including only the condition that a plurality of types of solid color regions having different brightness values are included.

REFERENCE SIGNS LIST 100, 100a: Projection system
1: Projector
2: Camera
3, 3a: Control device
30, 30a: Control unit
31: Communication unit
32: Storage unit
301: Reference content image acquisition unit
302: Camera deformation value calculation unit
303: Projector deformation value acquisition unit
304: Transmission content image acquisition unit
305: Transmission pattern image acquisition unit
306: Communication control unit 307: Correction unit
308: Transmission image acquisition unit

The invention claimed is:

1. A projection system comprising:
a projector configured to project a content image and a pattern image satisfying a predetermined condition onto a projection surface having a front surface, the front surface being not a solid color;
a camera configured to photograph the projection surface at a photographing timing, the photographing timing being a timing at which the pattern image is projected;
a processor; and
a storage medium having computer program instructions stored thereon, wherein the computer program instructions, when executed by the processor, perform processing of:
calculating a texture deformation value indicating a change in position, orientation, or shape of the projection surface on the basis of a camera image, the camera image being a photographing result of the camera, and
acquiring a projector deformation value of image deformation for converting an image projected by the projector into an image according to a state of the projection surface on the basis of the pattern image captured in the camera image and the texture deformation value,
wherein the predetermined condition includes a condition that a plurality of types of solid color regions having different brightness values are included, and
wherein the computer program instructions perform processing of:
calculating texture deformation value on the basis of a pattern of the front surface of the projection surface captured in a region captured in the camera image, the region being a region inside the solid color region and being a region located at a position away from an outer circumference of the solid color region by a distance according to a speed of movement or rotation of the projection surface and an interval between timings of photographing by the camera.

2. The projection system according to claim 1, wherein the predetermined condition further includes a condition that solid color regions having different brightness values included in a region of which a distance from an outer circumference is within a predetermined distance are larger than the solid color regions having different values included in the regions other than the region of which the distance from the outer circumference is within the predetermined distance.

3. The projection system according to claim 2, wherein the predetermined condition further includes a condition that, in a region other than an outer region, one or more of a plurality of types of solid color regions having different brightness values are included for each type per unit area, and the area of each solid color region is larger than a predetermined area according to a pattern of the front surface on the projection surface.

4. The projection system according to claim 3, wherein the predetermined condition further includes a condition that the pattern image is a polygon, a condition that one or a plurality of solid color regions of each type exist in a unit area in the region other than the outer region, and a total area of the solid color regions for each type is substantially the same in the unit area regardless of the type, a condition that a region having a predetermined size including vertices of the polygon inside the outer region is set as a corner region, one or a plurality of solid color regions of each type exist in a unit area in a region other than the corner region inside the outer region, and a total area of the solid color regions for each type is substantially the same in the unit area regardless of the type, and a condition that the corner region is one type of solid color region.

5. The projection system according to claim 3, wherein the predetermined condition further includes a condition that the pattern image is a circle or an ellipse, a condition that one or a plurality of solid color regions of each type exist in a unit area in the region other than the outer region, and a total area of the solid color regions for each type is substantially the same in the unit area regardless of the type, and a condition that one or a plurality of solid color regions of each type exist in a unit area in a region inside the outer region, and a total area of the solid color regions for each type is substantially the same in the unit area regardless of the type.

6. The projection system according to claim 1, wherein the computer program instructions further perform processing of:
acquiring the projector deformation value on the basis of an image showing a distribution of a reflectance on the projection surface.

7. The projection system according to claim 1, wherein two types of pattern images having the same shape are projected onto the projection surface, and a sum of a brightness value of each pixel in one of the pattern images and a brightness value of each corresponding pixel in the other of the pattern images is substantially the same regardless of the pixels.

8. The projection system according to claim 1, further comprising:
a correction unit configured to set an image displayed on the projection surface when the projection surface is a flat surface and the projector or the camera satisfies predetermined performance is set as a virtual image, set a deviation between the virtual image and the image projected by the projector as an image deviation, and correct the projector deformation value in order to reduce the image deviation, on the basis of a projector deformation value acquired on the basis of a camera image captured at a one more previous photographing timing and a projector deformation value acquired on the basis of a camera image captured at a previous photographing timing.

9. The projection system according to claim 3, wherein the predetermined area is an area according to a speed of change in position, orientation, or shape of the projection surface and a pattern of the surface of the projection surface.

10. A projection system control device comprising:
a projector configured to project a content image and a pattern image satisfying a predetermined condition onto a projection surface having a front surface, the front surface being not a solid color;
a camera configured to photograph the projection surface at a photographing timing, the photographing timing being a timing at which the pattern image is projected;
a processor; and
a storage medium having computer program instructions stored thereon, wherein the computer program instructions, when executed by the processor, perform processing of:
calculating a texture deformation value indicating a change in position, orientation, or shape of the projection surface on the basis of a camera image, the camera image being a photographing result of the camera, acquiring a projector deformation value of image deformation for converting an image projected by the projector into an image according to a state of the projection surface on the basis of the pattern image captured in the camera image and the texture deformation value, and executing processing of performing image deformation on the content image on the basis of the projector deformation value and processing of performing image deformation on the pattern image on the basis of the projector deformation value, wherein the predetermined condition includes a condition that a plurality of types of solid color regions having different brightness values are included, and an area of at least one of the plurality of types of solid color regions is larger than a predetermined area, and wherein the computer program instructions perform processing of:

calculating the texture deformation value on the basis of a pattern of the front surface of the projection surface captured in a region captured in the camera image, the region being a region inside the solid color region and being a region located at a position away from an outer circumference of the solid color region by a distance according to a speed of movement or rotation of the projection surface and an interval between timings of photographing by the camera.

11. A projection method comprising:

projecting a content image and a pattern image satisfying a predetermined condition onto a projection surface having a front surface, the front surface being not a solid color;

photographing the projection surface at a photographing timing, the photographing timing being a timing at which the pattern image is projected;

calculating a texture deformation value indicating a change in position, orientation, or shape of the projection surface on the basis of a camera image, the camera image being a photographing result in the photographing;

acquiring a projector deformation value of image deformation for converting an image projected in the projection into an image according to a state of the projection surface on the basis of the pattern image captured in the camera image and the texture deformation value; and executing processing of performing image deformation on the content image on the basis of the projector deformation value and processing of performing image deformation on the pattern image on the basis of the projector deformation value, wherein the predetermined condition includes a condition that a plurality of types of solid color regions having different brightness values are included, and wherein calculating the texture deformation value includes calculating the texture deformation value on the basis of a pattern of the front surface of the projection surface captured in a region captured in the camera image, the region being a region inside the solid color region and being a region located at a position away from an outer circumference of the solid color region by a distance according to a speed of movement or rotation of the projection surface and an interval between timings of photographing by the camera.

* * * * *